No. 888,229. PATENTED MAY 19, 1908.
A. ELMBERG.
VEGETABLE AND FRUIT PICKER.
APPLICATION FILED SEPT. 19, 1907.
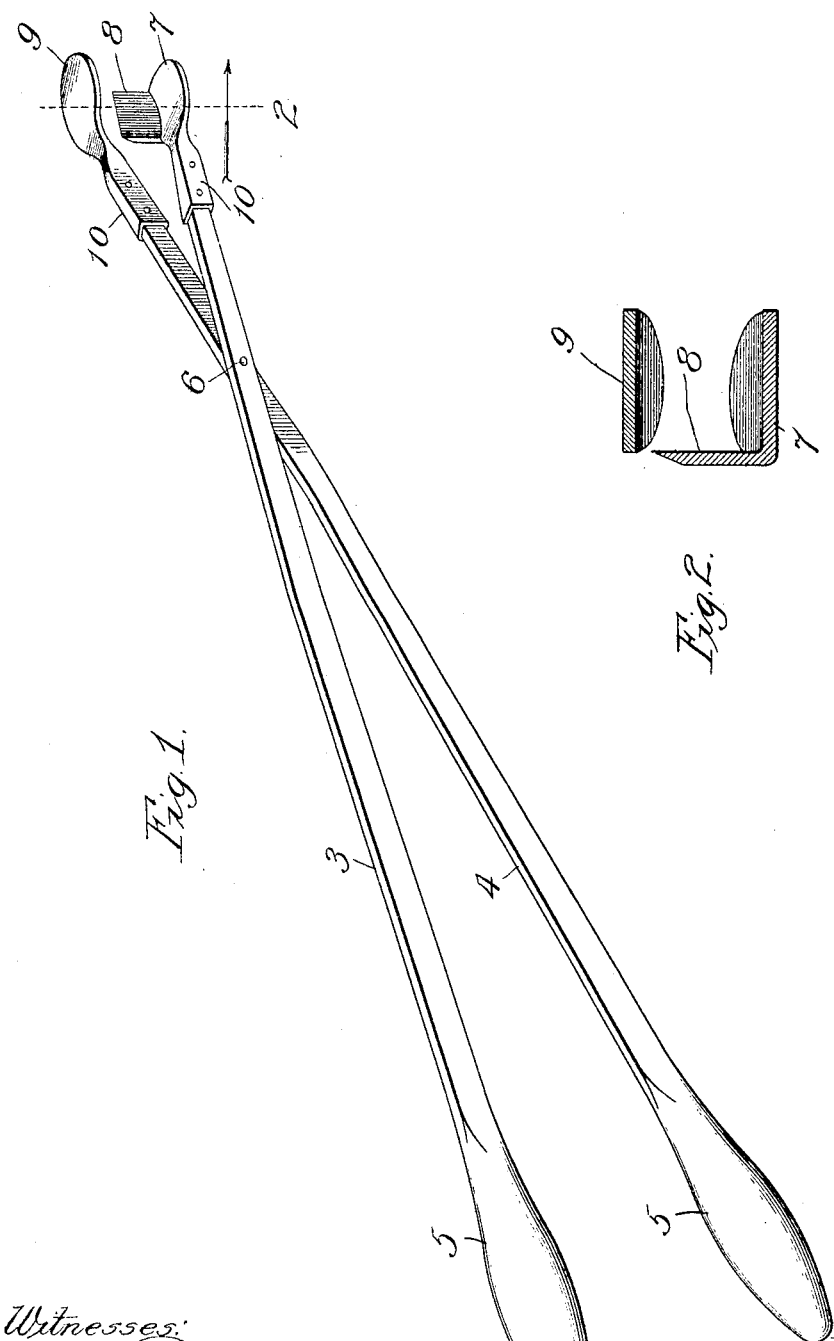

UNITED STATES PATENT OFFICE.

ANDREW ELMBERG, OF SYCAMORE, ILLINOIS, ASSIGNOR OF ONE-HALF TO ORATOR S. HOLCOMB, OF SYCAMORE, ILLINOIS.

VEGETABLE AND FRUIT PICKER.

No. 888,229.      Specification of Letters Patent.      Patented May 19, 1908.

Application filed September 19, 1907. Serial No. 393,645.

*To all whom it may concern:*

Be it known that I, ANDREW ELMBERG, a citizen of the United States, residing at Sycamore, in the county of Dekalb and State of Illinois, have invented a new and useful Improvement in Vegetable and Fruit Pickers, of which the following is a specification.

The object of my invention is to provide an implement of novel and simple construction which shall serve to facilitate the work of picking vegetables and fruit, more particularly that grow on vines on the ground, such as cucumbers, melons and the like, the picking of which by hand is rendered arduous because of the necessity of stooping in performing the work.

In the accompanying drawing, Figure 1 is a perspective view of my improved implement, and Fig. 2, a section taken at the line 2 on Fig. 1, viewed in the direction of the arrow and enlarged.

The device consists of a pair of coöperating shearing picker-jaws on handles suitably fulcrumed together to adapt the implement to be operated in the manner of shears for cutting the vine and in the manner of tongs for picking the vegetable or fruit and transferring it into a basket or other suitable receptacle.

The two handles 3, 4, each of which is shown to be provided with a hand-grasp 5, and which, for the sake of lightness, may be wooden, are crossed and fulcrumed at 6. The handle 3 carries the jaw 7 shown in its preferred concavo-convex or spoon shape and having extended at a right-angle from one edge a shearing-blade 8. On the handle 4 is provided the jaw 9 shown to be of the same shape as the jaw 7 and adapted to coöperate with the latter and exert at its edge adjacent to the blade 8, in coöperating therewith, a shearing action. Both jaws may be provided with sockets 10, as shown, for securing them on the ends of the handles of the implement.

To use the device for, say, picking cucumbers, the operator, standing erect with the handles in both of his hands, may utilize the jaw-ends primarily for searching the vines by turning them aside to expose the cucumbers; and to pick one so exposed he manipulates the handles to spread apart the jaws, which he then directs to the vegetable to grasp it, which is done by suitably manipulating the handles, and in gripping, the jaws cut the vines by the shearing action of the blade 8 and the adjacent edge of the jaw 9, and hold the cucumber between them to adapt it to be dropped, by opening the jaws, into any suitable receptacle that may be at hand.

While the construction of the implement as shown and described adapts it for use for picking vegetables and fruit of all kinds that grow upon vines on the ground, and also for picking fruit from trees, such as apples, pears and peaches, it may be modified to advantage with respect to dimension and shape of the jaws, more especially, and otherwise, the better to adapt it to its purpose for particular vegetables and fruit; but all such modifications are within the purview of the invention.

What I claim as new, and desire to secure by Letters Patent, is—

An implement of the character described, comprising, in combination, a pair of handles fulcrumed together between their ends, a spoon-shaped picker-jaw on one handle having a shearing-blade extending at an angle to it from one edge and a similarly-shaped picker-jaw on the other handle coöperating with said first-named jaw and the shearing blade thereon, for the purpose set forth.

ANDREW ELMBERG.

In presence of—
J. B. WEPKINS,
F. C. AHERN.